Aug. 20, 1946.   C. L. BURDICK   2,406,190
APPARATUS FOR IMPROVING THE EFFECTIVE USE OF EYESIGHT
AND PREVENTING STRAIN ON THE EYES
Filed Sept. 8, 1944
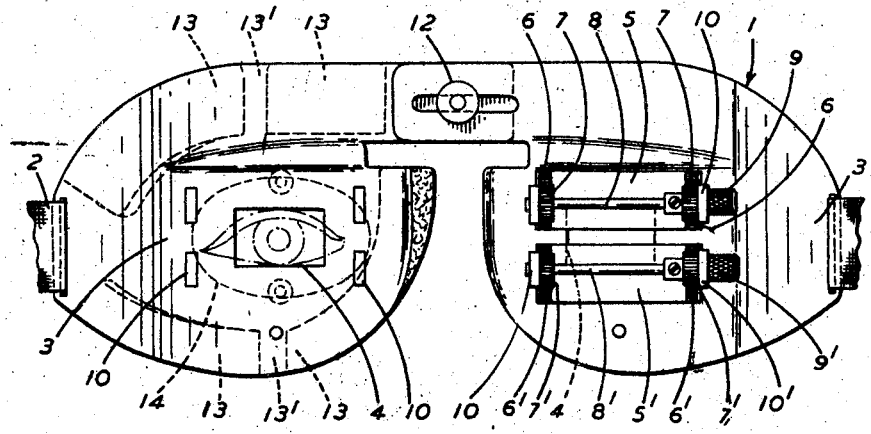
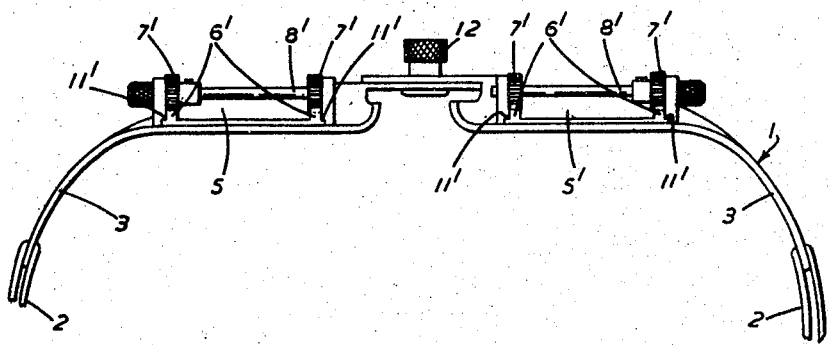
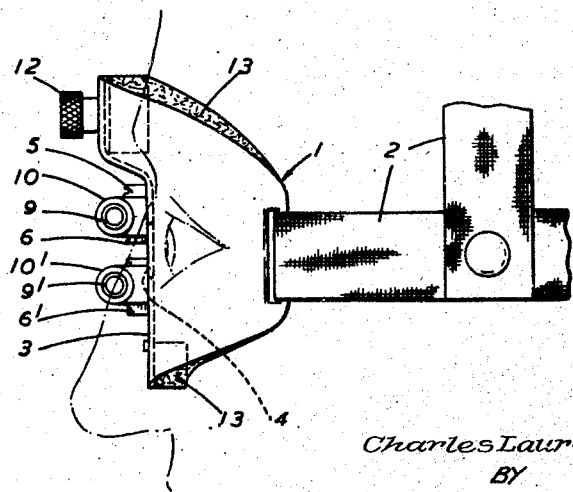
INVENTOR
Charles Laurence Burdick
BY
ATTORNEYS Patented Aug. 20, 1946

2,406,190

UNITED STATES PATENT OFFICE 2,406,190

APPARATUS FOR IMPROVING THE EFFECTIVE USE OF EYESIGHT AND PREVENTING STRAIN ON THE EYES

Charles Laurence Burdick, Brighton, England

Application September 8, 1944, Serial No. 553,154
In Great Britain April 4, 1944

1 Claim. (Cl. 88—41)

My invention relates to apparatus for improving the effective use of eyesight and preventing strain on the eyes. It is well known that the iris of the eye contracts to keep out excessive light and protects the eye from the injury which might occur if too much light was admitted. When this orifice is contracted it limits the effective surface area of the lens and thereby limits to some extent the efficiency of the organ of vision.

My invention consists of a device for shutting out or limiting the quantity of light admitted to the eye while permitting effective vision for especial purposes such as reading, writing and carrying on work which requires keenness of vision and for observation at sea or at long distances.

I am aware that many devices have been designed for shading the eyes. My invention consists essentially in mechanism for shutting out all of the extraneous light and limiting the aperture in front of the eye or eyes to a mere slit sufficient for the field of vision required for the especial purposes specified. I am also aware that vizors of many kinds have been used to protect the eyes from mechanical injury from flying spliners and the like, including vizors with cross-shaped and other slits: in such cases the object is to leave as large an area available for vision as is consistent with giving the desired protection and the field is often increased by using additional apertures. I do not regard my invention as analogous, since it is based upon an entirely different fundamental idea and requires the field of vision to be limited to substantially the minimum necessary for the particular purpose in view. The apertures, one in front of each eye, are in the form of horizontal slits which are formed to give the best field for the purposes in view and they are brought closely adjacent to the eye to combine an effective field with the minimum admission of extraneous light. The slits are preferably of set lengths and adjustable width (used to denote the vertical dimension), so that the wearer can reduce the width to the minimum necessary for his specific purposes while leaving a rather wide horizontal field; but it may in some cases be preferable to make trial in connection with a specific job and then to use fixed slits. I have found it preferable to have the slits substantially in a plane perpendicular to the axis of vision.

A long straight rectangular slit has been found most efficient for reading and for taking observations at sea, but the contour may be modified or shaped to meet various requirements.

My invention will be better understood by the following description and by reference to the accompanying drawing, of which:

Fig. 1 is a front elevation view, in which some of the details, which are duplicated on either side, are left out in order not to confuse the lines of the drawing, Fig. 2 is a view looking up from the lower side of Fig. 1, Fig. 3 is a side elevation view.

Numeral 1 in all of the three figures indicates the general shape of a mask or covering for that portion of the face which immediately surrounds the eyes. 2 in Figs. 2 and 3 indicate bands by means of which the mask is secured to the head, these bands may be elastic and provided with buckles or other means for fastening or adjustment.

It will be seen by reference to Figures 2 and 3 that a portion of the mask, indicated by the line 3 on either side is pressed back or shaped so as to provide an area the plane of which is at right angles with the axis of and close to the eye, preferably just clearing the lashes.

In this part of the mask I cut a rectangular hole 4, shown more clearly in the left hand side of Fig. 1. The upper and lower edges of this hole are limited by shutters 5—5' which are provided at either end with toothed racks 6—6'; these racks are engaged with pinions 7—7' secured to shafts 8—8'. Small finger knobs or heads 9—9' are secured to the shafts and provide means for raising or lowering the shutters. The shafts 8—8' are journalled in brackets 10—10' secured to the mask. The ends of the shutters may fall in grooves 11—11' in the base of the brackets 10—10' (see Fig. 2). I provide means for adjusting the width of the mask in order to meet the requirements of different persons whose eyes vary as to their distance apart. For this purpose I make the mask in two sections and provide at the top centre projections which overlap and are provided with slots into which a locking screw with nut 12 is secured.

I provide a cushioned lining 13 of sponge rubber or other flexible material secured to the interior of the mask in places where it meets the face; the pieces of lining may be so arranged as to leave gaps 13' outside the field of vision for ventilation. The lining is omitted for clearness in Fig. 2.

On the left hand side of Fig. 1 I show in dotted lines 14 how glass lenses may be secured to the inner side of the mask, behind the opening, to meet the especial requirements of those whose eyes require them.

While the adjusting mechanism for the width of the apertures are shown in detail, the mask may be made without shutters but provided with standard apertures.

It will be apparent that the user can ascertain the minimum width required by him for a specific purpose and set the slot widths for use or having done so can be provided with a mask having slots of the ascertained width.

I claim:

A mask having apertures therein and adapted to cover that portion of the wearer's face immediately surrounding the eyes and constructed to exclude direct extraneous light except through said apertures, said apertures being of sufficient height to include the centers of the pupils of any normal eyes, a pair of shutters for each aperture, and means to adjust each of said shutters up and down to define between the shutters a slit of the desired width opposite the center of the pupil of the eye behind the same, said means consisting of toothed racks on the ends respectively of each shutter, and a rotatable toothed member on the mask which meshes with said racks.

CHARLES LAURENCE BURDICK.